United States Patent
Wang et al.

(10) Patent No.: US 6,800,386 B1
(45) Date of Patent: Oct. 5, 2004

(54) FUEL PROCESSOR

(75) Inventors: Xingwu Wang, Wellsville, NY (US); Huihui Duan, Alfred Station, NY (US); Bigang Min, Alfred Station, NY (US)

(73) Assignee: Nanoset, LLC, East Rochester, NY (US)

( * ) Notice: Subject to any disclaimer, the term of this patent is extended or adjusted under 35 U.S.C. 154(b) by 348 days.

(21) Appl. No.: 10/082,612

(22) Filed: Feb. 25, 2002

Related U.S. Application Data

(63) Continuation-in-part of application No. 10/013,178, filed on Dec. 8, 2001.

(51) Int. Cl.[7] .................................................. H01M 8/00
(52) U.S. Cl. .......................... 429/13; 429/17; 205/343; 205/637; 48/127.1; 48/127.7
(58) Field of Search ..................... 429/13, 17; 205/343, 205/637; 48/127.1, 127.7

(56) References Cited

U.S. PATENT DOCUMENTS

| | | | | |
|---|---|---|---|---|
| 6,207,122 B1 | * | 3/2001 | Clawson et al. | 423/418.2 |
| 6,254,839 B1 | * | 7/2001 | Clawson et al. | 422/190 |
| 6,468,480 B1 | * | 10/2002 | Clawson et al. | 422/211 |
| 6,503,648 B1 | * | 1/2003 | Wang | 429/21 |
| 6,641,625 B1 | * | 11/2003 | Clawson et al. | 48/127.9 |

* cited by examiner

Primary Examiner—Bruce F. Bell
(74) Attorney, Agent, or Firm—Howard J. Greenwald

(57) ABSTRACT

A process for preparing hydrogen in a fuel processor assembly containing a device for supplying a high voltage electrical discharge within the fuel processor, a first catalytic body disposed within the fuel processor, and a second catalytic body disposed within the fuel processor. Each of the catalytic bodies have different shapes.

15 Claims, 12 Drawing Sheets

US 6,800,386 B1

FUEL PROCESSOR

CROSS-REFERENCE TO PRIOR PATENT APPLICATION

This application is a continuation-in-part of applicants' copending patent application U.S. Ser. No. 10,013,178, filed on Dec. 8, 2001.

GOVERNMENT RIGHTS

The experiments described in the examples of this specification were partially funded by a grant from the United States Environmental Protection Agency, under contract number R 828 737 01-0 between the Environmental Protection Agency and Alfred University. The United States of America may have certain rights in the inventions described in such examples.

FIELD OF THE INVENTION

A process for producing hydrogen ustilizing a specified fuel processor for converting hydrocarbon fuel (such as methane) into hydrogen.

BACKGROUND OF THE INVENTION

U.S. Pat. No. 6,254,839 describes an apparatus for converting hydrocarbon fuel into hydrogen gas and carbon dioxide. In particular, the patentees describe a reformer for converting a hydrocarbon fuel into hydrogen gas and carbon dioxide comprising: a first tube including a first catalyst; a second tube annularly disposed about the first tube; a fuel fractionator configured to convert a quantity of hydrocarbon feedstock into a first fuel and a second fuel, wherein the second fuel is heavier in average molecular weight than the first fuel; a first fuel line interconnecting the fuel fractionator and the first tube; a steam supply line communicating with the first tube; a second fuel line interconnecting the fuel fractionator and the second tube; and an oxygen-containing gas supply line communicating with the second tube. The entire disclosure of this United States patent is hereby incorporated by reference into this specification.

The yield of hydrogen produced in the process of U.S. Pat. No. 6,254,389 was only about 40 molar percent. It is an object of this invention to provide a fuel processor, which produces hydrogen in a much higher yield.

SUMMARY OF THE INVENTION

In accordance with this invention, there is provided a process for preparing hydrogen in a fuel processor assembly comprised of a means for supplying a high voltage electrical discharge within said fuel processor, a first catalytic body disposed within said fuel processor, and a second catalytic body disposed within said fuel processor, wherein said first catalytic body and said second catalytic body have different shapes.

BRIEF DESCRIPTION OF THE DRAWINGS

The invention will be described by reference to the following drawings, in which like numerals refer to like elements, and in which.

DESCRIPTION OF THE PREFERRED EMBODIMENTS

Figure 1:
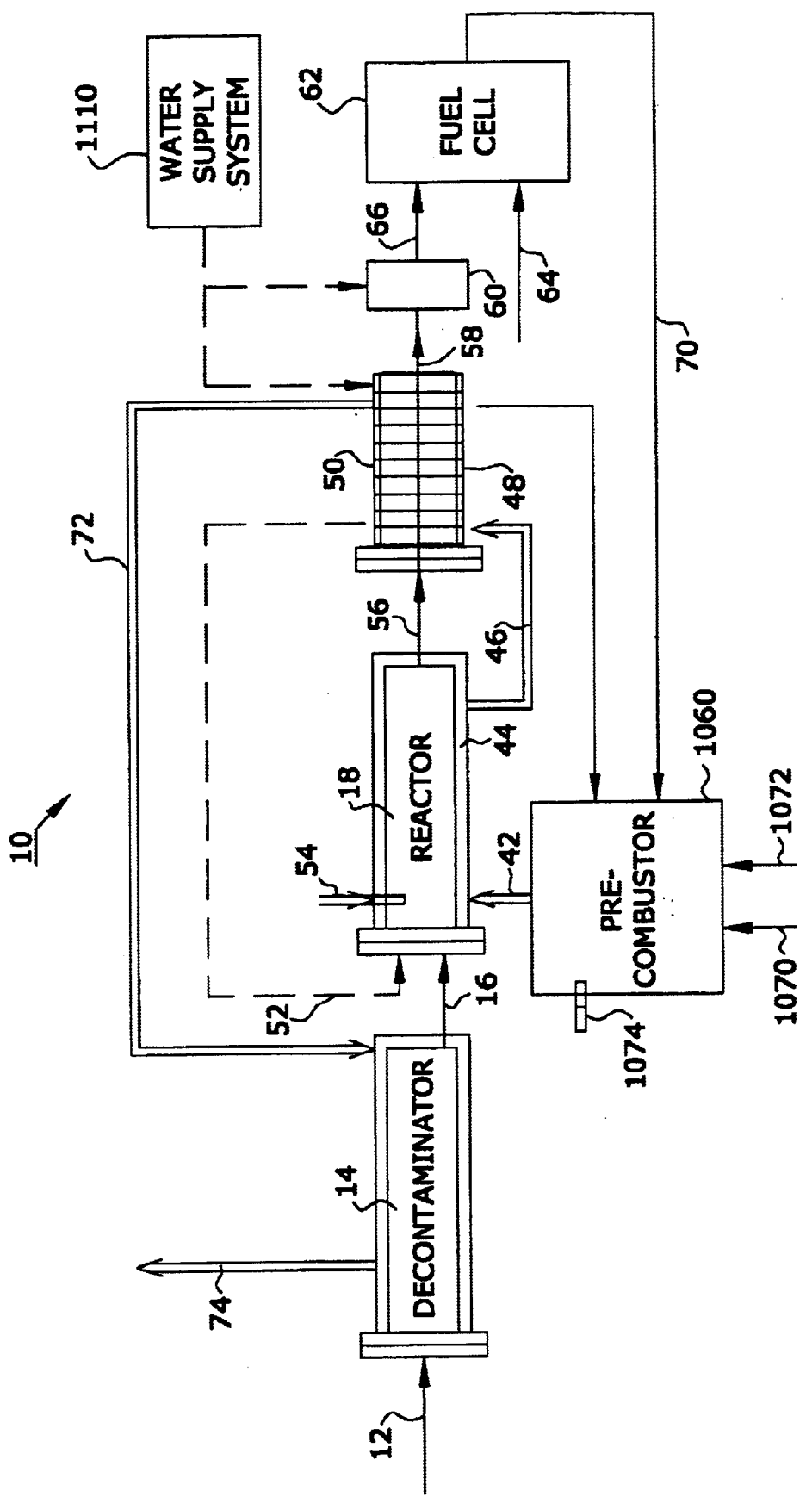
FIG. 1 is schematic of one preferred process of the invention.

FIG. 1 is a flow diagram of one preferred process 10 of the invention. Referring to FIG. 1, and in the preferred process depicted therein, a hydrocarbon fuel (not shown) is fed via line 12. Prior to being fed via line 12, the fuel is preferably compressed to a pressure of from about 5 pounds per square inch gauge to about 80 pounds per square inch gauge. In one embodiment, the compressor used is a guided rotor compressor; see, e.g., the disclosures of U.S. Pat. Nos. 5,431,551 and 6,301,898, the entire disclosures of which are hereby incorporated by reference into this specification.

As used herein, the term hydrocarbon refers to any material that contains hydrogen and carbon atoms. The term hydrocarbon fuel refers to a hydrocarbon that either is in the liquid phase and/or the gaseous phase. These hydrocarbon fuels are well known and are described, e.g., in U.S. Pat. Nos. 6,221,280, 6,210,821, 6,159,256, 6,156,084, 6,007, 931, 5,747,185, 5,429,886, and the like. The entire disclosure of each of these United States patents is hereby incorporated by reference into this specification.

By way of further illustration, the hydrocarbon fuel may be a liquid hydrocarbon fuel. Thus, e.g., one may use liquid fuels such as distillate, naphtha, diesel oil, heavy fuel oil, etc.

In one embodiment, the hydrocarbon fuel is a gaseous hydrocarbon fuel. Suitable gaseous hydrocarbon fuels include, e.g., methane, ethane, propane, butane, acetylene, propylene, butylene, natural gas, biomass gas, landfill gas, swamp gas, and the like. Reference may be had, e.g., to U.S. Pat. Nos. 6,309,770, 6,245,303, 6,168,705, 5,741,605, 5,601,937, 5,541,014, 5,498,487, and the like. The entire disclosure of each of these United States patents is hereby incorporated by reference into this specification.

In one embodiment, hydrogen-containing non-hydrocarbon gases may be used as the feedstock. Thus, e.g., one may use ammonia, impure hydrogen, etc.

Referring again to FIG. 1, the gas used in the process depicted in such Figure preferably contains less than about 10 volume percent of material that does not contain extractable hydrogen, and more preferably contains less than about 5 volume percent of such contaminants. Thus, by way of illustration and not limitation, one may preferably remove sulfur, sulfur-containing gases, metals (such as potassium, iron, aluminum, etc.), phosphorous, phosphorous containing gases, and the like. Referring to FIG. 1, such contaminant(s) may be removed in gas decontaminator 14.

One may use conventional gas decontaminators for purifying the gas fed via line 12. Thus, by way of illustration and not limitation, one may use one or more of the purifying devices disclosed in U.S. Pat. No. 4,329,160 (molecular sieve purifier), U.S. Pat. No. 4,040,806 (hydrogen gas purifier), U.S. Pat. No. 4,714,487 (purification of C3 and C4 fractions), U.S. Pat. Nos. 4,233,141, 4,952,748, 5,321,952, 5,948,378 (purification of synthesis gas), and the like. The entire disclosure of each of these United States patents is hereby incorporated by reference into this specification.

Referring again to FIG. 1, and in the preferred embodiment depicted therein, the hydrocarbon gas is fed via line 12 to decontaminator 14. In one aspect of this embodiment, the decontaminator 14 is a desulfurizer which utilizes, e.g., zinc oxide to remove sulfur.

One may use any conventional desulfurizer for removing sulfur from the hydrocarbon gas. Reference may be had, e.g., to U.S. Pat. No. 6,159,256 (device for purifying gas for fuel cell use), U.S. Pat. No. 5,878,675 (flue gas desulfurizer), U.S. Pat. No. 6,190,620 (wet flue gas desulfurizer), U.S. Pat. Nos. 6,149,713, 5,769,909 (fuel gas desulfurizer), U.S. Pat. Nos. 4,420,333, 4,230,594 (spent reducing gas desulfurizer), U.S. Pat. Nos. 6,316,134, 6,159,256, and the like. The entire disclosure of each of these United States patents is hereby incorporated by reference into this specification.

Referring again to FIG. 1, the decontaminated gas is preferably fed via line 16 to reactor 18, in which hydrogen is extracted from the purified fuel. One may use any of the hydrogen extractors known to those skilled in the art. Reference may be had, e.g., to U.S. Pat. No. 6,284,398 (fuel cell reformer), U.S. Pat. Nos. 6,245,303, 6,221,280 (partial oxidation of fuel), U.S. Pat. No. 6,207,122 (production of hydrogen and carbon dioxide), U.S. Pat. Nos. 6,126,908, 6,083,425, 6,077,620, and the like. The entire disclosure of each of these United States patents is hereby incorporated by reference into this specification.

Reactor 18 is preferably maintained at a temperature of from about 300 to about 1,000 degrees Celsius and, more preferably, from about 600 to about 900 degrees Celsius. It is also preferred to maintain the pressure within reactor 18 at less than about 65 pounds per square inch gauge. In one embodiment, the pressure within reactor 18 is maintained at from about 25 to about 45 pounds per square inch gauge.

Disposed within reactor 18 are at least two catalysts bodies that facilitate the production of hydrogen from hydrocarbons. Such catalyst bodies are well known. Reference may be had, e.g., to U.S. Pat. Nos. 6,245,303, 6,254,893, 6,207,122, 6,123,913, 6,126,908, and the like. The entire disclosure of each of these United States patents is hereby incorporated by reference into this specification.

In one preferred embodiment of the invention, the gas being treated first contacts one catalyst body aid then contacts another catalyst body. Without wishing to be bound to any particular theory, applicants believe that, when the catalytic processes occur sequentially rather than simultaneously, the overall reaction is more efficient.

In the process of this invention, it is preferred that the gas being treated contact one of the catalytic bodies for at least about 10 milliseconds, and thereafter contact the other of the catalytic bodies for at least about 10 milliseconds. This process may be repeated many times. However many times it is repeated, any particular molecule of gas will preferably be in contact with only one of the catalytic bodies at any one point in time and will maintain such contact for at least about 10 milliseconds.

Figure 2:
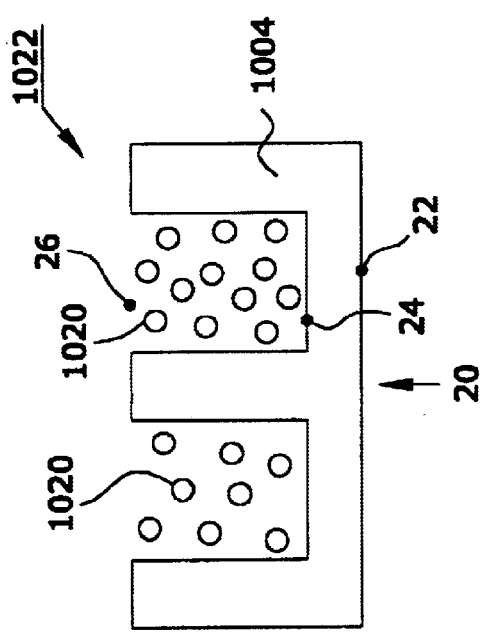
FIG. 2 is a sectional view of one preferred catalyst receptacle used in the process of this invention.

FIG. 2 illustrates one preferred means for effecting the process of this invention. Referring to FIG. 2, it will be seen that a receptacle 1022 is comprised of a substrate 1004; and the receptacle contains pellets 1020. This substrate 1004, and these pellets 1020, are described elsewhere in this specification (see Example 1).

Referring to FIG. 2, gas is passed through receptacle 1022 in the direction of arrow 20. At point 22, the gas first contacts the substrate 1004; and it continues to travel through the substrate 1004 until point 24, when it first contacts the pellets 1020.

The travel time for the gas to diffuse from point 22 to point 24 is generally at least about 10 milliseconds and often is in the range of from about 10 milliseconds to about 2 seconds. Once the gas has reached point 24, then it diffuses through the pellets 1020 to point 26. In general, this latter diffusion will also take at least 10 milliseconds to occur.

In the embodiment depicted in FIG. 2, each of substrate 1004 and pellets 1020 are ceramic bodies which comprise catalyst on their outside faces.

The ceramic/catalytic bodies used in the device depicted in FIG. 2 preferably have a minimum dimension larger than 100 microns; and they preferably have a minimum dimension larger than 1 millimeter. It is preferred that such ceramic bodies do not readily become sintered during the reforming process.

The porosity of the ceramic/catalytic bodies preferably is from about 20 to about 80 percent. In one embodiment, the porosity of such ceramic bodies is from about 30 to about 70 percent. In yet another embodiment, such porosity is from about 40 to about 60 percent.

Each of the ceramic/catalytic bodies is comprised of from about 1 to about 100 grams of one or more catalysts per cubic foot of the ceramic material. In one embodiment, the ceramic bodies are comprised of from about 10 to about 80 grams of catalyst per cubic foot of ceramic material. In another embodiment, the ceramic bodies are comprised of from about 30 to about 60 grams of catalyst per cubic foot of ceramic material.

The catalysts may differ from one ceramic body to another, either in their concentration and/or their physical structure and/or their chemical identity and/or their shapes. The catalyst bodies do differ from one to the other in one or more of the physical and/or chemical properties, and/or in their chemical composition, and/or in their catalyst loading (s), etc.

The ceramic/catalytic bodies used in the device depicted in FIG. 2 preferably have a surface area to volume ratio of at least about 10 to about 500, square meters/cubic meters.

Referring again to FIG. 2, and in the process depicted therein, a sequence is depicted in which a gas molecule first contacts one ceramic/catalytic body, and then contacts another ceramic/catalytic body. This process is preferably repeated several times within the reactor 18. Thus, as is illustrated in example 1, the gas molecules will preferably sequentially repeat this process at least two times.

Figure 3:
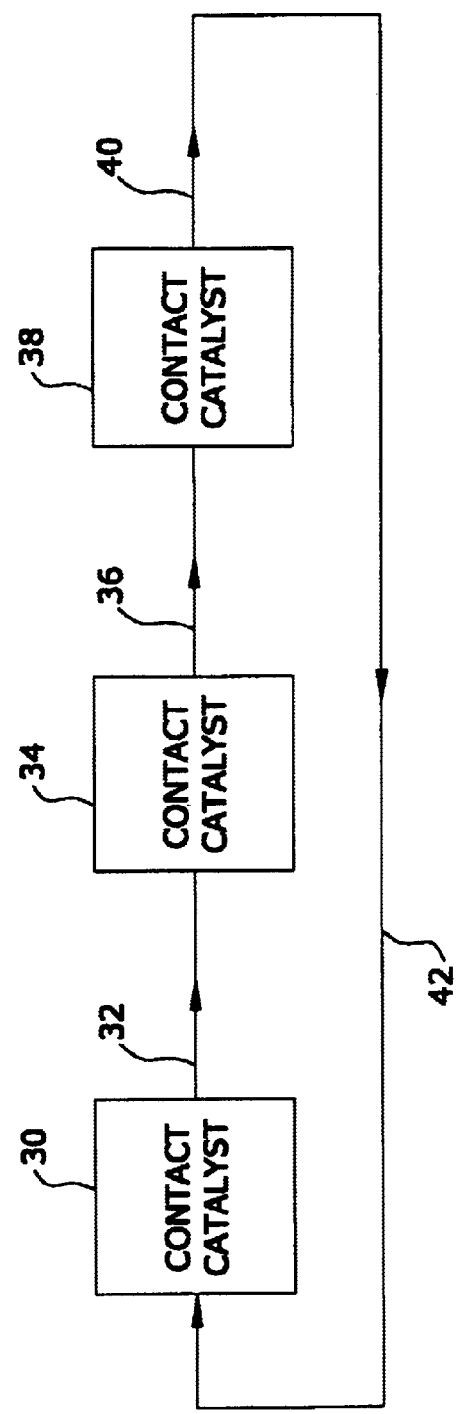
FIG. 3 is a flow diagram illustrating a preferred process for alternately contacting gas molecules with different catalyst bodies.

FIG. 3 is a flow diagram illustrating schematically what preferably happens to particular molecules of the gas during the process. In step 30 of FIG. 3. the gas molecule contacts catalyst on the surface of ceramic body 1004; this step corresponds to point 22 in FIG. 2. hereafter, in transition step 32, the gas molecule travels through a porous portion of the substrate 1004 which does not contact as much catalyst; during this transition step 32, the gas molecule becomes more homogeneous.

As the gas molecule continues through the substrate 1004, it will reach point 24 (see FIG. 2), at which point it will again contact catalyst on the surface of the ceramic body 1004; this corresponds to step 34 of FIG. 3.

When the gas molecule leaves the surface of the ceramic body 1004, it will then pass through some empty space in transition step 36, during which it does not contact as much catalyst; during this transition step, the gas molecule tends to become more homogenous again.

Thereafter, the gas molecule will contact a pelletized ceramic body 1020, during which it will contact catalyst on the surface of such palletized ceramic body; this corresponds to step 38 of FIG. 3. Thereafter, the gas molecule will pass into a region of the palletized ceramic body 1020 during which it will contact less catalyst; during this transition step (step 40), it will again tend to become more homogeneous. The process may be repeated many times, both within any particular bed of palletized particles, and within any fuel processor that contains a multiplicity of assemblies 1022 (see FIG. 2; also refer to example 1). Thus, is schematically represented by recycle line 42, the process depicted in FIG. 3 is preferably repeated many times, at least about 5 times in one embodiment.

Referring again to FIG. 1, and to the preferred embodiment depicted therein, the reactor 18 is preferably preheated to a temperature of from about 300 to about 900 degrees Celsius and, more preferably, from about 600 to about 900 degrees Celsius. One may use heated hot gas from precombustor 1060 (see example 4) that is fed and processed in accordance with the procedure of Example 4.

In the embodiment depicted in FIG. 1, a high voltage electrical discharge device 1074 is preferably used to ignite the gas within precombuster 1060. This high voltage electrical discharge is preferably at least 1000 volts, and more preferably, is at least 2,000 volts. In one embodiment, the electrical discharge is at a voltage in excess of 10,000 volts.

In one embodiment, the high voltage electrical discharge is in the form of a pulse with a duration of from about 1 to about 50 milliseconds. Such a pulse may be created, e.g., with a 12 volt direct current power supply and a current of about 5 milliamperes.

In one preferred embodiment, ionized species are formed from the gaseous hydrocarbon and air disposed within the precombuster 1060. In this embodiment, the concentration of free hydrogen and/or hydrogen ion within precombustor 1060 is preferably less than about 5 molar percent.

The process occurring within precombustor 1060 occurs rapidly, generally within no more than 10 seconds. Within that period of time, the specified electrical pulse is provided, combustion occurs, ionization occurs, and the temperature of the precombustor rises from about ambient temperature to a temperature generally in excess of 600 degrees Celsius. After such combustion, generally the gaseous material in the precombustor is preferably comprised primarily of carbon dioxide and steam, with less than about 5 molar percent of hydrogen and less than about 5 molar percent of methane, and nitrogen.

The heated gaseous moieties from precombustor 1060 are conveyed via line 42 to the outside of the reactor 18, wherein it travels through a heat exchanger 44 to transfer heat to the reactor 18. The heat exchanged gas then travels though line 46 and may be fed to a heat exchanger 48 disposed around hydrogen purifier 50, to furnish heat to the hydrogen purifier 50.

Referring again to FIG. 1, and in the preferred embodiment depicted therein, steam is fed via line 52 to the reactor 18. Alternatively, or additionally, air may be fed into reactor 18 via line 54.

The output from reactor 18, which preferably comprises at least about 50 molar percent of hydrogen, is fed via line 56 to hydrogen purifier 50. One may use any conventional hydrogen purifier. Reference may be had, e.g., to U.S. Pat. Nos. 5,612,012, 4,749,793, 4,003,725, 3,972,695, and the like. The entire disclosure of each of these United States patents is hereby incorporated by reference into this specification.

The purified hydrogen from hydrogen purifier 50 is fed via line 58 to hydrogen humidity adjuster 60, in which the water content of the hydrogen is adjusted to a level, which the fuel cell 62 requires. In general, proton exchange membrane fuel cells require a mixture of hydrogen and water at a temperature of from about 120 to about 160 degrees Fahrenheit and a moisture content of from about 20 to about 60 volume percent, by volume of hydrogen and water. Reference may be had, e.g., to U.S. Pat. Nos. 6,030,718, 6,218,035, 5,942,347, 5,264,299, 6,190,791, 5,879,826, and the like for a discussion of these proton exchange membrane fuel cells. The entire disclosure of each of these United States patents is hereby incorporated by reference into this specification.

In addition to adjusting the humidity level of the hydrogen gas, conditioner 60 may also adjust its temperature, in accordance with the needs of the fuel cell 62. The conditioner may remove moisture from the hydrogen gas; or water may be added to the hydrogen gas via water supply system 1110 (see example 7). The water supplied may be furnished to the conditioner 60 and/or the hydrogen purifier 50 and/or the reactor 18, in the manner illustrated.

In one embodiment, the moisture content of the hydrogen fed to the fuel cell 62 is from about 35 to about 45 volume percent, and the temperature of the mixture is from about 130 to about 150 degrees Fahrenheit.

In addition to the hydrogen mixture being fed via line 66, air is fed into the fuel cell 62 via line 64. In one embodiment) the air is compressed air at a pressure of from 5 pounds per square inch to about 60 pounds per square inch.

In one preferred embodiment, illustrated in FIG. 1, residual hydrogen is fed from fuel cell 62 via line 70 back to precombuster 1060. Alternatively, or additionally, the hydrogen from fuel cell 62 may be fed to any external site In one embodiment, heated gas from heat exchanger 48 is fed via line 72 back to decontaminator 14. Exhaust gas from decontaminator 14 may be exhausted via port 74.

Figure 11:
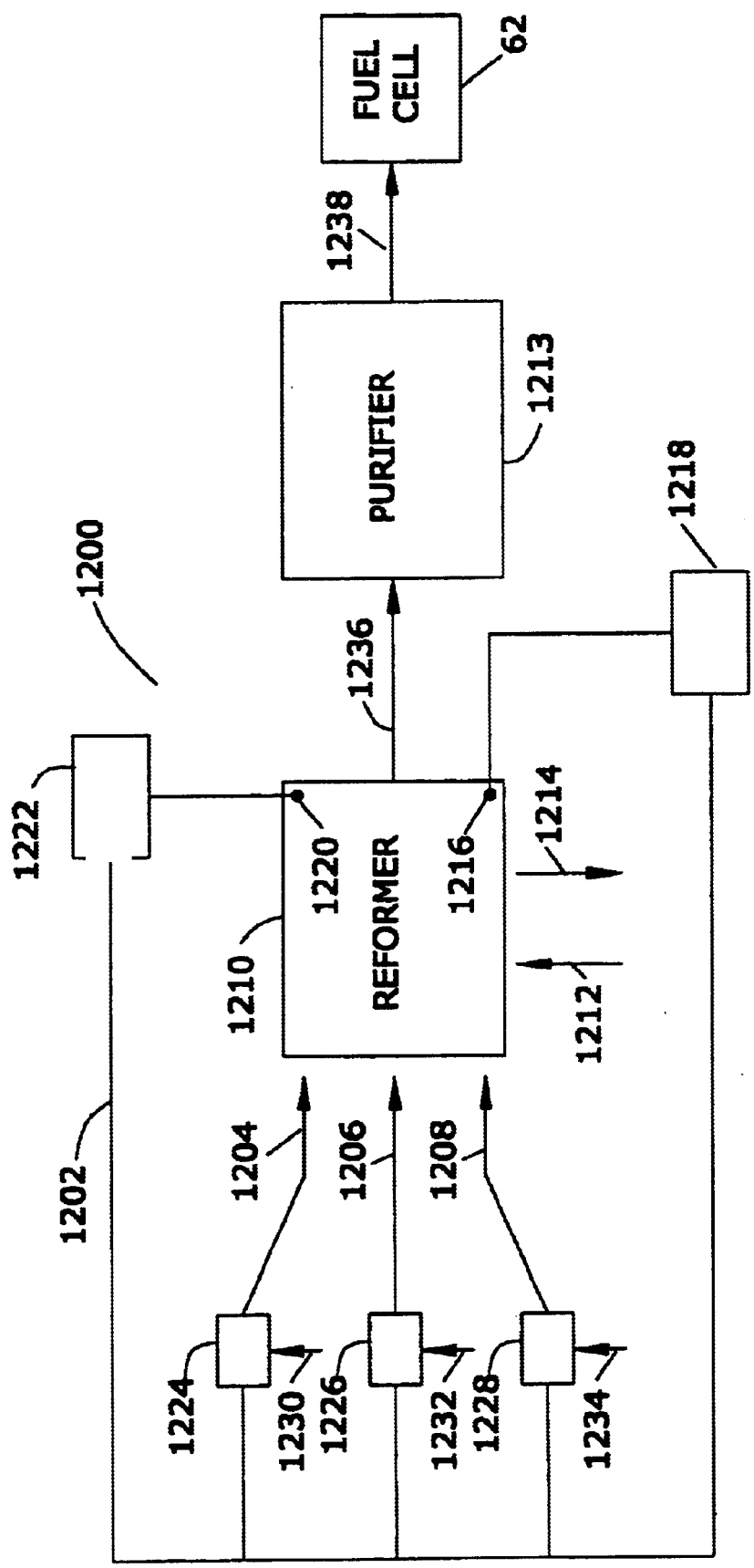
FIG. 11 is a flow diagram describing one preferred process of the invention.

FIG. 11 is a flow diagram of a preferred process 1200. Referring to FIG. 11, and in step 1202, reactant gases are fed from lines 1204, 1206, and 1208 into reformer 1210. The object of reformer 1210 is to provide hydrogen for hydrogen purifier 1213.

The gas fed via line 1204 preferably is a hydrocarbon gas, such as methane, gaseous diesel fuel, gaseous JP-8, gaseous JP-10, gaseous methanol, naphtha, gaseous low-sulfur distillates, natural gas, synthetic natural gas, gaseous heavy fuel oil, vaporized coal, vaporized solid waste, and the like.

The gas fed via line 1206 is preferably an oxygen-containing gas, such as, e.g., air, oxygen, ozone, and the like.

The gas fed via line 1208 is preferably a water-containing gas, such as, e.g., steam.

In the embodiment where methane is fed via line 1204, air is fed via line 1206, and steam is fed via line 1208, is preferred to feed such gases that the composition with the reformer 1202 is comprised of from about 1 mole of methane for each mole of air present, and about 2 moles of steam for each mole of methane present. These ratios may vary slightly. Thus, there can be from about 0.9 to about 1.1 moles of methane for each mole of air, and from about 1.8 to about 2.2 moles of steam for each mole of methane.

As used in this specification, the term air refers to a gas that contains about 20 volume percent of oxygen and about 80 volume percent of nitrogen. The term steam refers to a gas that consists essentially of water vapor at a temperature exceeding 100 degrees Celsius.

In the embodiment described above, where oxygen is used to replace the air fed, then about 5 moles of methane will be fed for each mole of oxygen, and about 10 moles of steam will be fed for each mole of oxygen.

In the embodiment where methane is fed via line 1204, air fed via line 1206, but no steam is fed via line 1208, from about 0.9 to about 1.1 moles of methane is fed for each mole of air. When oxygen is used to replace the air feed, then about 4.5 to about 5.5 moles of methane are used for each mole of oxygen fed.

In the embodiment where methane is fed via line 1204, and steam is fed via line 1208, but no air is fed via line 1206, from about 3.6 to about 4.4 moles of steam are fed for each mole of methane fed.

Referring again to FIG. 11, its is preferred to utilize a temperature of from about 600 to about 1100 degrees Celsius within reformer 1210. In one embodiment, it is preferred to use a temperature of from about 600 to about 850 degrees Celsius within reformer 1210. In another embodiment, the temperature within reformer 1210 is from about 780 to about 820 degrees Celsius.

One may use conventional means for maintaining the temperature within the reformer 1210 within the desired range. In the embodiment depicted in FIG. 11, heat may be furnished to the reformer via line 1212 and/or removed from the reformer via line 1214. Sensor 1216 is preferably connected to a controller 1218 to insure the correct temperature within the reformer.

Referring again to FIG. 11, the pressure within the reformer 1210 is preferably maintained at from about 10 to about 70 pounds per square inch. In one embodiment, such pressure is maintained at from about 15 to about 60 pounds per square inch. One may use conventional means for controlling such pressure. In the embodiment depicted, a pressure controller 1222 is operatively connected to a pressure sensor 1220. It is preferred that the pressure controller 1222 also be operatively connected to the controller 1218.

As will be apparent, when the temperature is above or below the desired level, one may add or subtract heat. When the pressure is higher or lower than the desired level, than the controller 1218 preferably will communicate with mass flow controllers 1224, 1226, and 1228 to adjust the gas flows until the desired pressure is obtained, provided that the adjusted gas flows still provide the desired molar ratios.

Referring again to FIG. 11, the gases fed via lines 1204, 1206, and 1208 are initially fed into their respective controllers 1224, 1226, and 1228 via input lines 1230, 1232, and 1234.

It is preferred to react the desired gas mixture, with its preferred temperature and pressure level, within the reformer 1210, for from about 0.1 to about 50 seconds and, preferably, from about 1 to about 10 seconds.

In one embodiment, where only methane is fed via line 1204 and air/oxygen is fed via line 1206, it is preferred that the dwell time be from about 1 to about 10 seconds. In one aspect of this embodiment, the dwell time is from 5 to 10 seconds and most, preferably, from about 6 to about 8 seconds. In this embodiment, when the methane/air ratio is about 1:1, and the temperature within the reformer is 800 degrees Celsius, and the pressure within the reformer is 14.7 pounds per square inch, and the dwell time is 7 seconds, the yield of hydrogen is 52 percent. By comparison, when the experiment is repeated with a dwell time of 1 second, the yield of hydrogen is only 35 percent.

Referring again to FIG. 11, the hydrogen produced in reformer 1210 is fed via line 1236 to purifier 1213, wherein it can be purified in the manner described elsewhere in this specification. It is preferred to purify the hydrogen in die manner depicted in FIG. 12.

Referring again to FIG. 11, the purified hydrogen is then fed via line 1238 to fuel cell 62.

Figure 12:
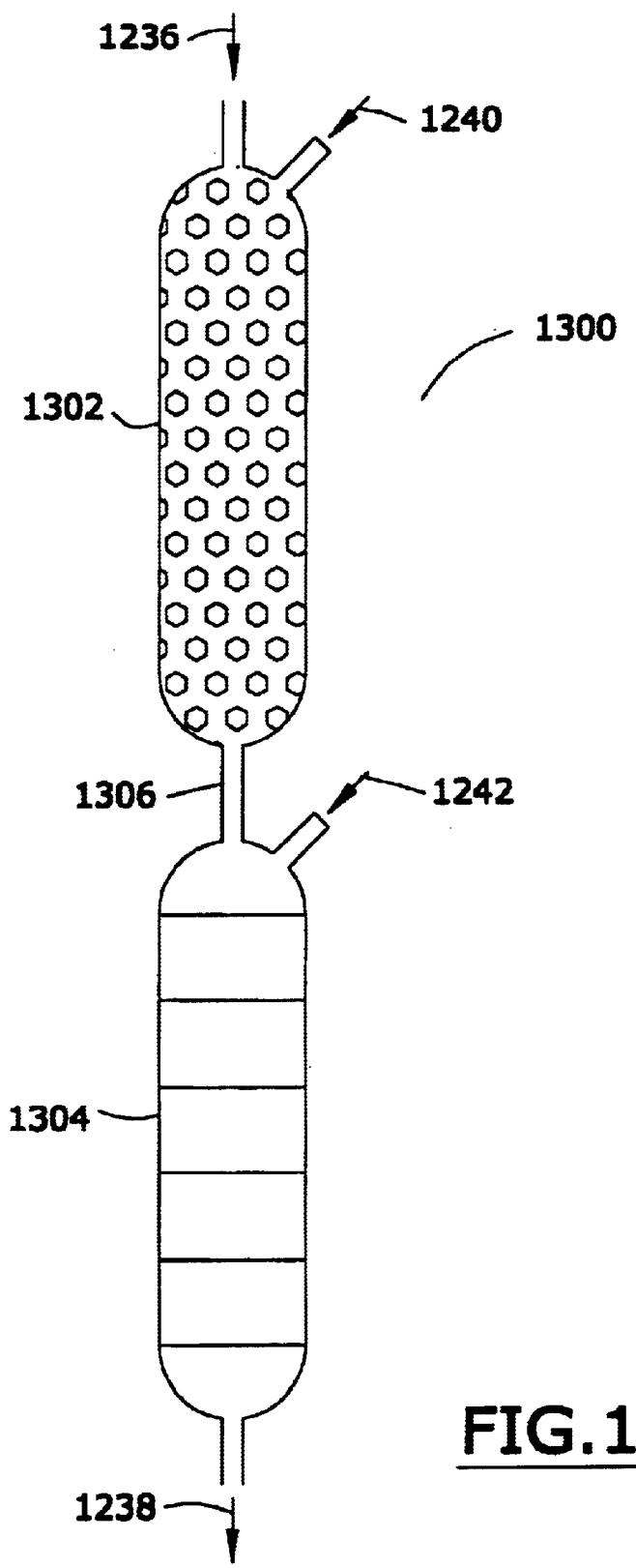
FIG. 12 is a schematic of one preferred hydrogen purifier of the invention.

FIG. 12 is a schematic diagram of one preferred hydrogen purifier 1300. Referring to FIG. 12, it will be seen that purifier 1300 is comprised of a first reactor 1302 and a second reactor 1304 connected by line 1306. In this embodiment, reactor 1302 is preferably comprised of copper/zinc pellets suspended by mesh. These copper/zinc pellets reduce the amount of carbon monoxide within the reactor 1302 to a level of less than about 1 mole percent, based upon the total number of moles of gases within the reactor 1302. In general, the carbon monoxide concentration of gas entering the reactor 1302 is preferably reduced by at least about 70 percent and, preferably, at least about 80 percent.

In the embodiment depicted in FIG. 12, steam may be fed via line 1236 and/or via line 1240.

It is preferred to maintain the gases being purified within the reactor 1302 for a period of from about 1 to about 10 seconds and, preferably, from about 2 to about 4 seconds. The temperature within the reactor 1302 is preferably from about 180 to about 240 degrees Celsius and, more preferably, from about 200 to about 230 degrees Celsius. The pressure within the reactor 1302 from about 14 to about 16 pounds per square inch.

Referring again to FIG. 12, the partially purified gas is passed via line 1306 to second reactor 1304. It is preferred that this second reactor 1304 have an oxygen-rich atmosphere and it contain from about 5 to about 20 mole percent of oxygen. To that end, as necessary, additional oxygen or oxygen-containing gas may be fed into reactor 1304 via line 1242, while the partially purified gas is fed via line 1306. The temperature within the reactor 1304 is preferably maintained at a temperature of from about 150 to about 200 degrees Celsius and, more preferably, from about 160 to about 180 degrees Celsius. The pressure within reactor 1304 is preferably maintained at from about 14 to about 16 pounds per square inch. The dwell time within the reactor 1304 is preferably from about 0.5 to about 5 seconds and, more preferably, from about 1 to about 3 seconds.

In one embodiment, disposed within reactor 1304 are a multiplicity of reticulated foam ceramic disks catalyzed with ruthenium. These disks are commercially available from, e.g., High-Tech Ceramics of Alfred, New York; they have 60 pores per inch, and comprise 92 percent of alumina The coating on the disks, ruthenium, is provided by the Sud-Chemie Inc as a 50 gram per cubic foot coating.

It is preferred that the gas exiting the reactor 1304 contain less than 50 parts per million of carbon monoxide.

Figure 8:
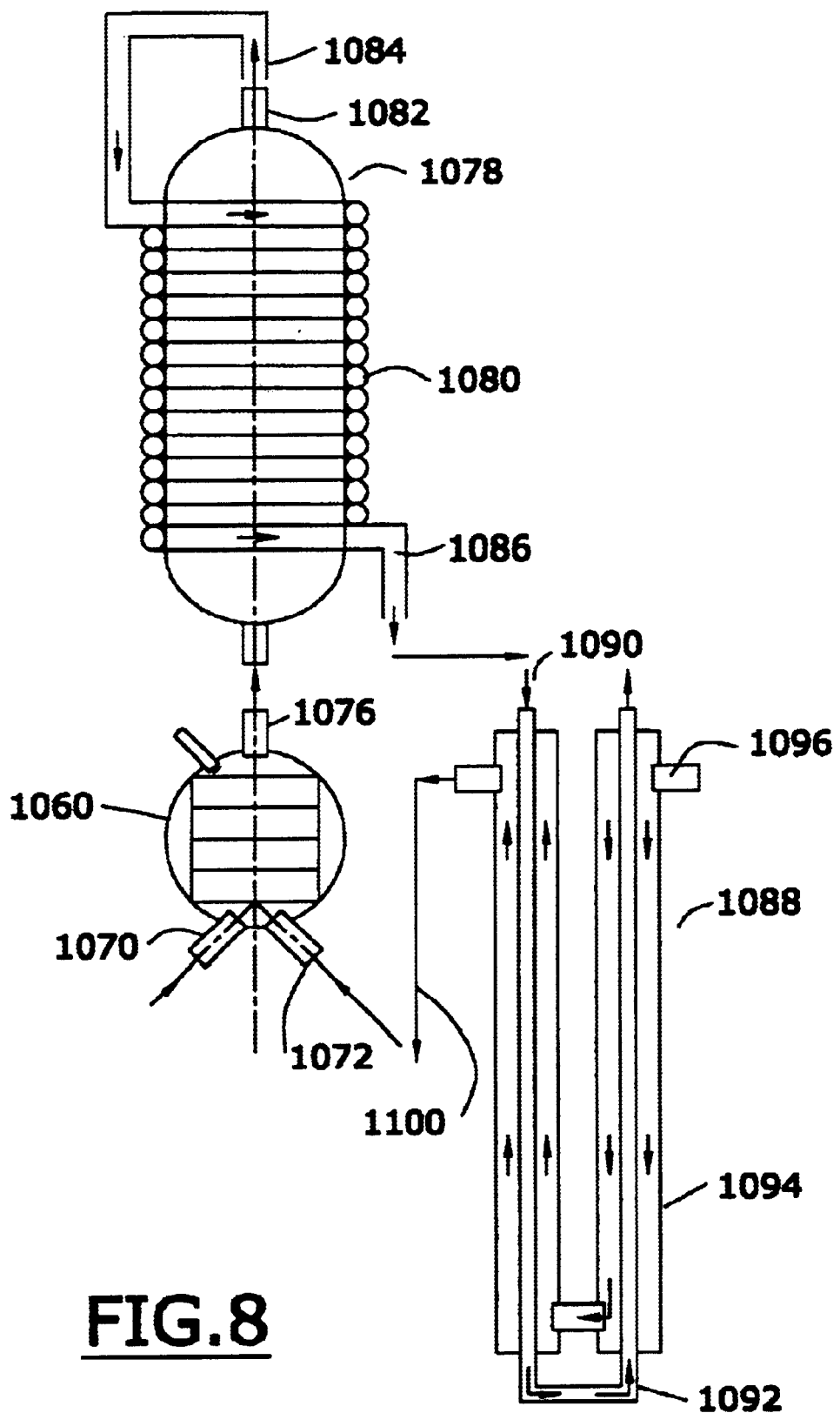
FIG. 8 is a schematic view of a portion of one preferred process of the invention.
Figure 13:
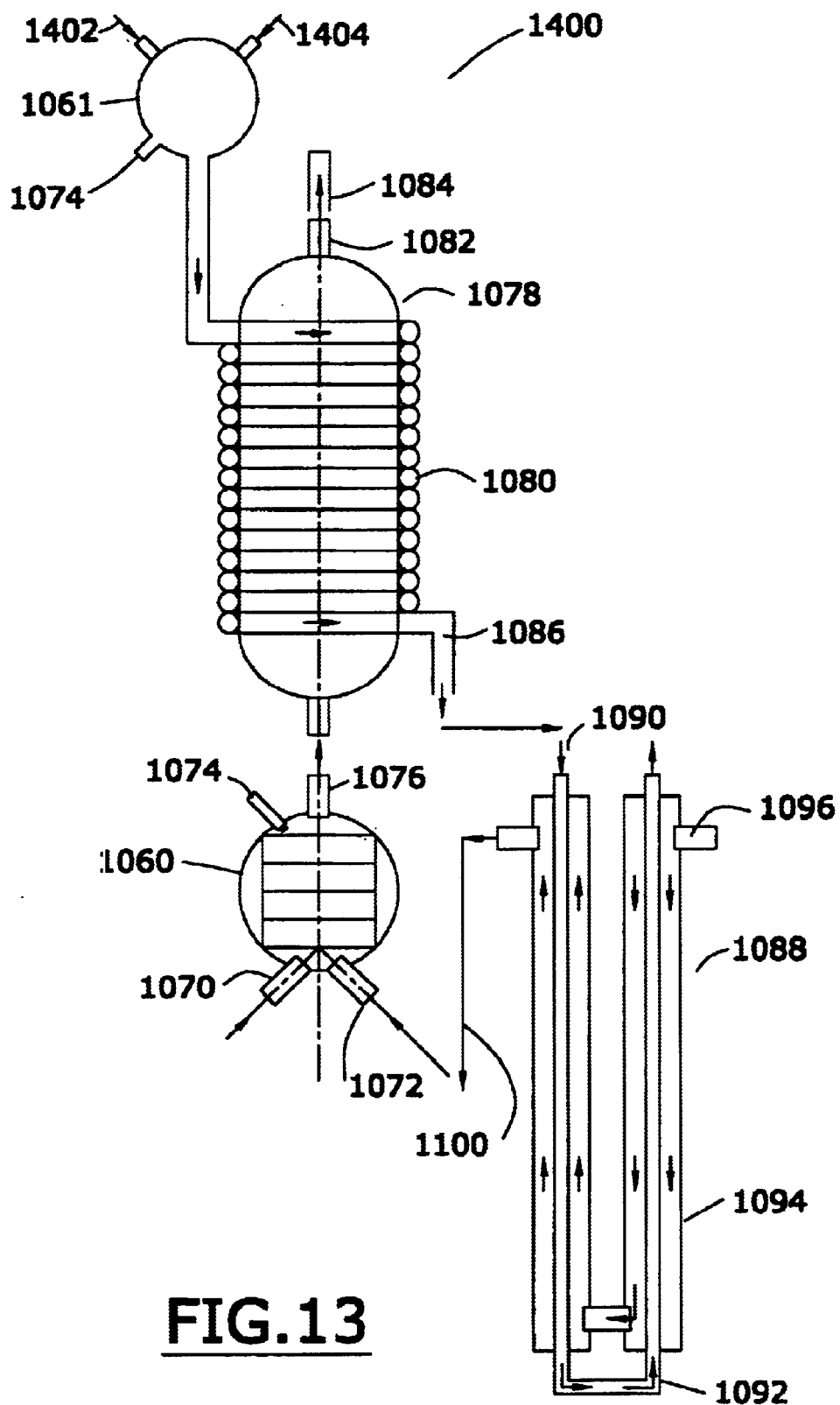
FIG. 13 is a schematic of one purified fuel processor of the invention.

FIG. 13 is a schematic of a preferred reformer 1400 which is substantially identical to the reformer depicted in FIG. 8 but differs therefrom in that a second precombustion chamber 1061 is used to furnish hot gases to the heat exchanger 1080. This second precombustion chamber 1061 may be identical to, or different, then, the precombustion chamber 1060, and the same and/or different conditions may be used herein. As will be apparent, in the embodiment of FIG. 13 an additional source of heat is furnished to the reformer 1400.

In one preferred embodiment, air is fed via line 1402, and methane is fed via line 1404, in the manner described elsewhere in this specification by reference to the precombustion chamber 1060. The spark plug igniter 1074 operates in each device in the manner described elsewhere in this specification.

In one preferred embodiment, illustrated in FIG. 13, water is fed into line 1096; in one embodiment, a mixture of water and air is fed into line 1096. In this embodiment, the air is fed at a rate of about 5 to 20 standard liters per minute while the water is fed at a rate of from about 10 to 20 grams per minute. In one embodiment, the water preferably is at an ambient temperature, and it is fed at a rate sufficient to provide 16 grams per minute of water.

As will be apparent, and in the preferred embodiment depicted, hot gases is fed from line 1086 into heat exchanger 1088. The heat from such hot gases is used to vaporize the water fed via line 1096, which then is converted into steam and fed via line 1100 into the precombustor 1060.

Referring again to FIG. 13, and in the preferred embodiment depicted therein, methane is fed via line 1070 at a rate of from about 5 to about 20 standard liters per minute and, preferably, from about 8 to about 12 standard liters per minute.

A hydrogen yield of up to about 60 molar percent has been obtained with the process of this FIG. 13. In this embodiment, the hydrogen flow rate of the reformed gas is preferably from about 21 to about 30 standard liters per minute, for a feed rate of 10 standard liters per minute of methane, 10 standard liters per minute of air, and 20 standard liters per minute of steam. In one aspect of this embodiment, the hydrogen flow rate is from about 27 to about 29 standard liters per minute.

Referring again to FIG. 13, the temperature within reactor 1078 preferably is maintained at from about 600 to about 850 degrees Celsius and, more preferably, from about 730 to about 770 degrees Celsius. The pressure within such reactor 1078 is preferably from about 14 to about 16 pounds per square inch.

The following examples are presented to illustrate the invention but are not to be deemed limitative thereof. Unless otherwise specified, all parts are by weight and all temperatures are in degrees Celsius.

EXAMPLE 1

Figure 4:
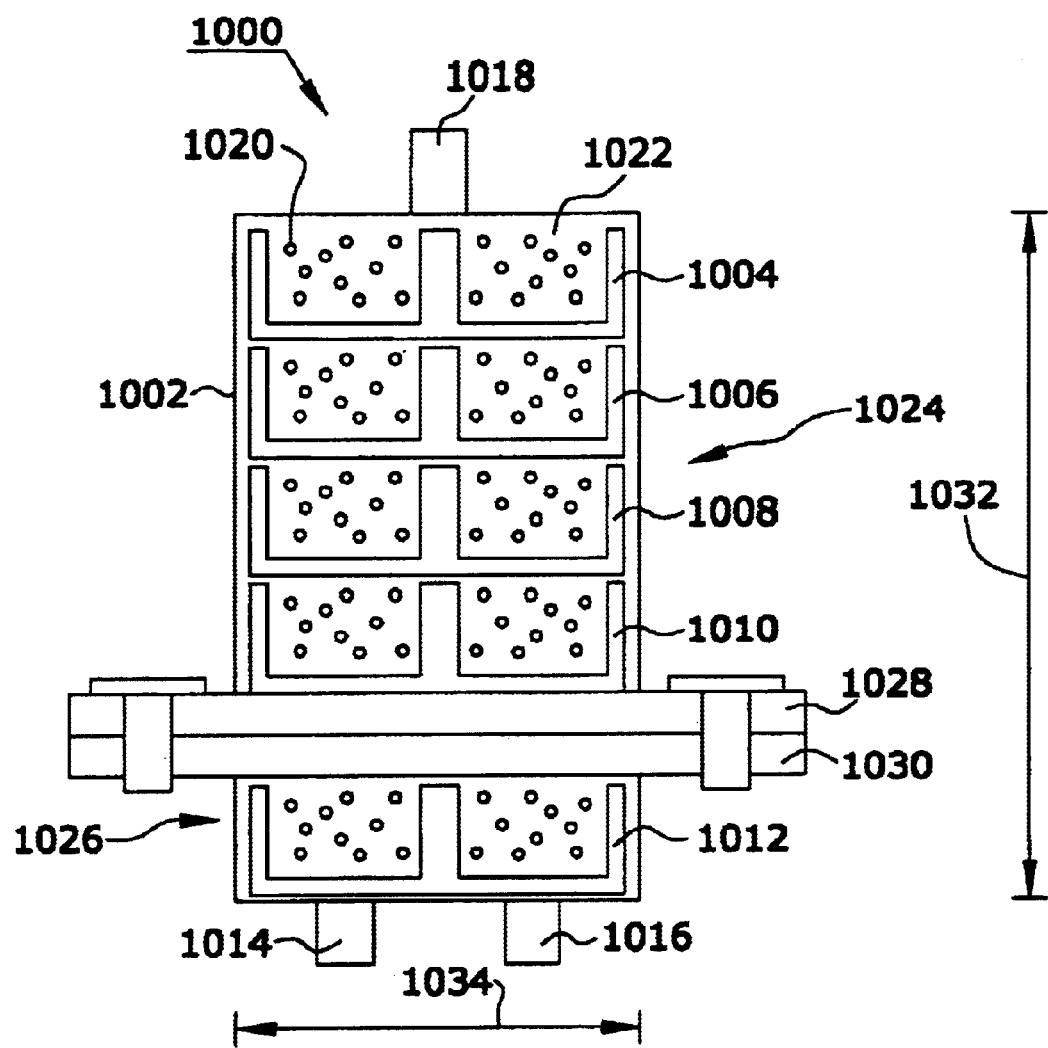
FIG. 4 is a schematic view of one preferred reactor used in the process of the invention.

FIG. 4 is a schematic view of a reactor 1000 used in the experiment of this example. The reactor is comprised of 316 stainless steel pipe 1002, and substrates 1004, 1006, 1008, 1010, and 1012.

Each of the substrates was formed from cordierite (14 percent magnesium oxide, 35 percent alumina, and 51 percent silica), had the receptacle shape depicted in FIG. 4, and were obtained from the Hi-Tech Ceramics Company of Alfred, N.Y. These substrates so purchased had a density of 0.45 grams per cubic centimeter, a modulus of rupture of 192 pounds per square inch, a compressive strength of 215 pounds per square inch, and a thermal expansion coefficient of $1.2 \times 10^6$ per degree Celsius.

The substrates obtained from Hi-Tech Ceramics were coated with FCR-HC1 catalyst, obtained from Sud-Chemie Inc. of Lousiville, Ky. This catalyst comprises at least about 90 weight percent of platinum and minor amounts of cerium and gadolinium. A layer of the catalyst, approximately 30 microns in width, was coated onto the surface of the substrates.

Each of the substrates 1004 et seq. was porous, having a porosity of about 50 percent. This porosity allowed for the flow of gas through the assembly.

A methane port 1014 and a steam port 1016 were utilized to introduce the gaseous reactants into the system. Each of ports 1014 and 1016 was a 0.5 inch Swagelock gas tight fitting. The gas produced in the assembly was removed from port 1018, which also was a 0.5 inch Swagelock fitting.

In addition to the catalyst coated onto the substrates 1004 et seq., pelletized catalyst 1020 was disposed within each of the substrates 1004 et seq. These catalyst pellets were obtained from the Prototech Company, a subsidiary of Sud-Chemie Prototech Inc., 32 Fremont Street, Needham, Ma. The pellets had an average diameter of about 0.12 inches, were spherical in shape, and were comprised of an alumina core coated with platinum and rhodium. The load density for the platinum was 37.5 grams per cubic foot of alumina, and the load density for rhodium was 12.5 grams per cubic foot of alumina.

Each of the substrates 1004 et seq. was comprised of a receptacle 1022 which had a depth of about 2 inches and a height of about 1 inch. Each receptacle 1022 was entirely filled with the palletized catalyst.

The assembly 1000 was comprised of a top section 1024 and a bottom section 1026 joined by upper and lower flanges 1028 and 1030, respectively. The overall length 1032 of the assembly 1000 was 10 inches, and the outside diameter 1034 of the assembly 1000 was 3.5 inches.

The assembly 1000 was disposed within a ceramic band heater (not shown) obtained from the Omega Heater Company of Ronkonkoma, N.Y.

In the experiment of this example, methane with a purity of at least 99.9 percent was flowed into port 1014 at a flow rate of 1 liter per minute and at a delivery pressure of 60 pounds per square inch. Steam made from distilled water was introduced into port 1016 at a flow rate of 4 liters per minute and a delivery pressure of 60 pounds per square inch.

During the experiment, the heater was used to maintain the temperature within assembly 1000 at 800 degrees Celsius.

A gas mixture was removed from port 1018. This gas mixture was comprised of 76 molar percent of hydrogen, about 14 molar percent of carbon monoxide, about 2 molar percent of methane, and eight molar percent of other gaseous moieties (such as nitrogen and carbon dioxide).

The theoretical yield of hydrogen was 80 molar percent.

EXAMPLE 2

A gas mixture similar in composition to the mixture produced in the experiment of Example 1 (see FIG. 4) was purchased from Sigma-Aldrich, Inc. of Bellefonte, Pa. as catalog number 149. This gaseous mixture contained 60 molar percent of hydrogen, 10 molar percent of carbon monoxide, 10 molar percent of carbon dioxide, 10 molar percent of nitrogen, and 10 molar percent of methane.

Figure 5:
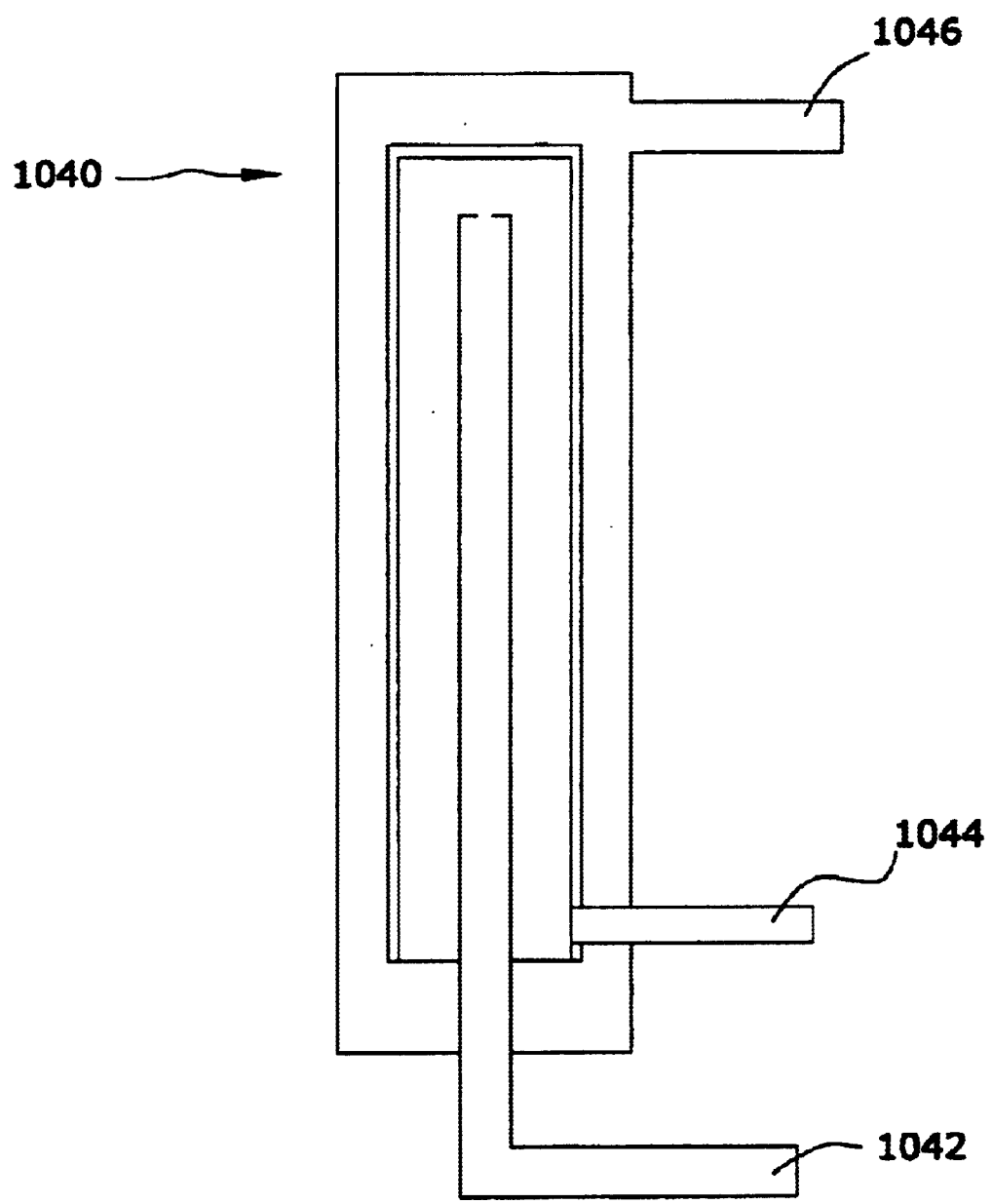
FIG. 5 is a schematic view of one preferred hydrogen purifier used in the process of the invention.

A hydrogen purifier was purchased from REB Research and Consulting Company of 3259 Hilton Road, Ferndale, Mich. as a "Complete Hydrogen purifier, 0.5 slpm size". The hydrogen purifier 1040 so purchased had the configuration depicted in FIG. 5. It was a tubular device with a length of about 12 inches, and a diameter of about 1 inch. Disposed within the purifier was a palladium membrane in a tubular configuration.

An Omegalux Rope Heater (obtained from the Omega Company of One Omega Drive, Stamford, Conn.) was disposed around the hydrogen purifier 1040 and used to heat the purifier so that its internal temperature was 400 degrees Celsius.

The impure gas mixture was fed into the purifier 1040 via port 1042 at a delivery pressure of 60 pounds per square inch. Impurities were bled from the system at port 1044. Pure hydrogen was removed from the system via port 1046. The hydrogen gas so produced was at least about 99.9 percent pure.

EXAMPLE 3

Using the reactor described in Example 1 (see FIG. 4), the experiment of Example 1 was substantially repeated with the exception that, instead of steam, compressed air was introduced into port 1016. The compressed air had a delivery pressure of 60 pounds per square inch, and it was delivered at a flow rate 3 standard liters per minute; the methane was introduced via port 1014 at a flow rate of 3 standard liters per minute.

The gas removed from port 1018 contained 52 molar percent of hydrogen, 10 molar percent of carbon monoxide, and 10 molar percent of methane, with the balance the gas being comprised of nitrogen and other components.

The theoretical yield of hydrogen, as calculated for the primary process, was 38 percent. Without wishing to be bound by any theory, applicants believe that secondary chemical processes contributed to the actual yield being higher than the theoretical yield.

EXAMPLE 4

In the experiment of this example, a precombustion chamber 1060 was used. The configuration of this precombustion chamber is disclosed in FIG. 6.

Figure 6:
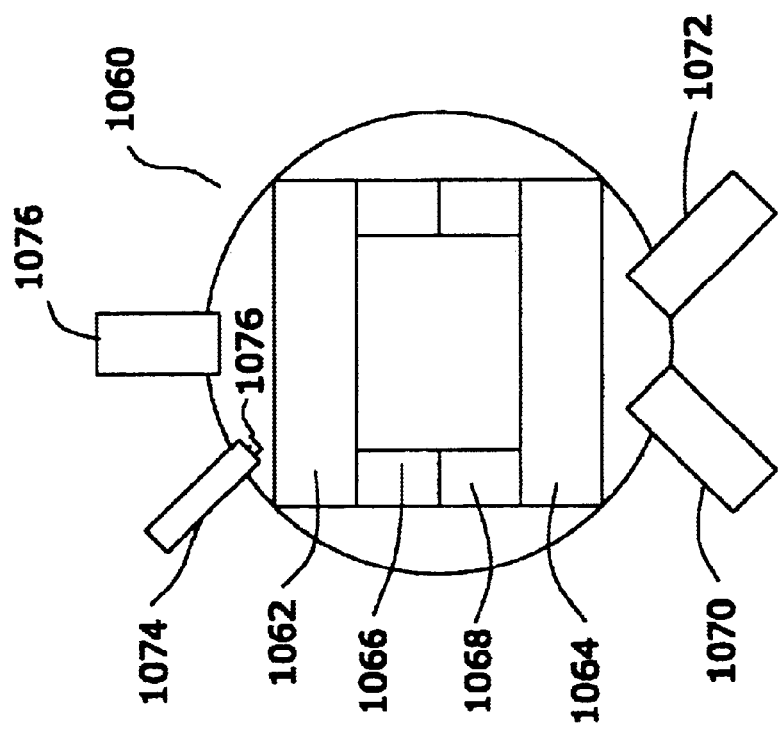
FIG. 6 is a sectional view of one preferred precombustor used in the process of the invention.

Referring to FIG. 6, the chamber 1060 had a spherical shape with a bottom half and a top half removably joined to each other; the chamber 1060 had an outside diameter of about 3.5 inches, and its walls were about 0.25 inches thick; and the parts comprising this chamber were purchased from McMaster-Carr Supply Company of NewJersey.

Disposed within the chamber 1060 were two ceramic disks 1062 and 1064, and two ceramic rings 1066 and 1068. Each of the ceramic disks and ceramic rings had the same composition as the substrates 1014 et seq. used in the experiment of example 1, with the same substrate material but with no coating. The ceramic disks 1062/1064 had a diameter of 3 inches and a thickness of 0.5 inches. The ceramic rings 1066/1068 had a inside diameter of 2 inches, and outside diameter of 3 inches, and a thickness of 0.5 inch. The configuration depicted allowed for uniform dispersion of the gas within the assembly.

The assembly 1060 was comprised of methane port 1070, and an air port 1072 These ports 1070/1072 were disposed vis-a-vis each other at about a 90 degree angle to facilitate the mixing of the methane with the air.

A spark plug 1074 connected to a source of electrical energy (not shown) was partially disposed within the chamber 1060 so that its tip 1076 extended about 0.5 inches into such chamber 1060. The spark plug 1074 was a Champion spark plug, model RC9YC, obtained from an automobile supply store. A power source (not shown) delivered pulses of direct current, at a frequency of 33 Hertz, and a voltage in excess of 10,000 volts. The duration of each pulse was about 15 milliseconds.

Figure 7:
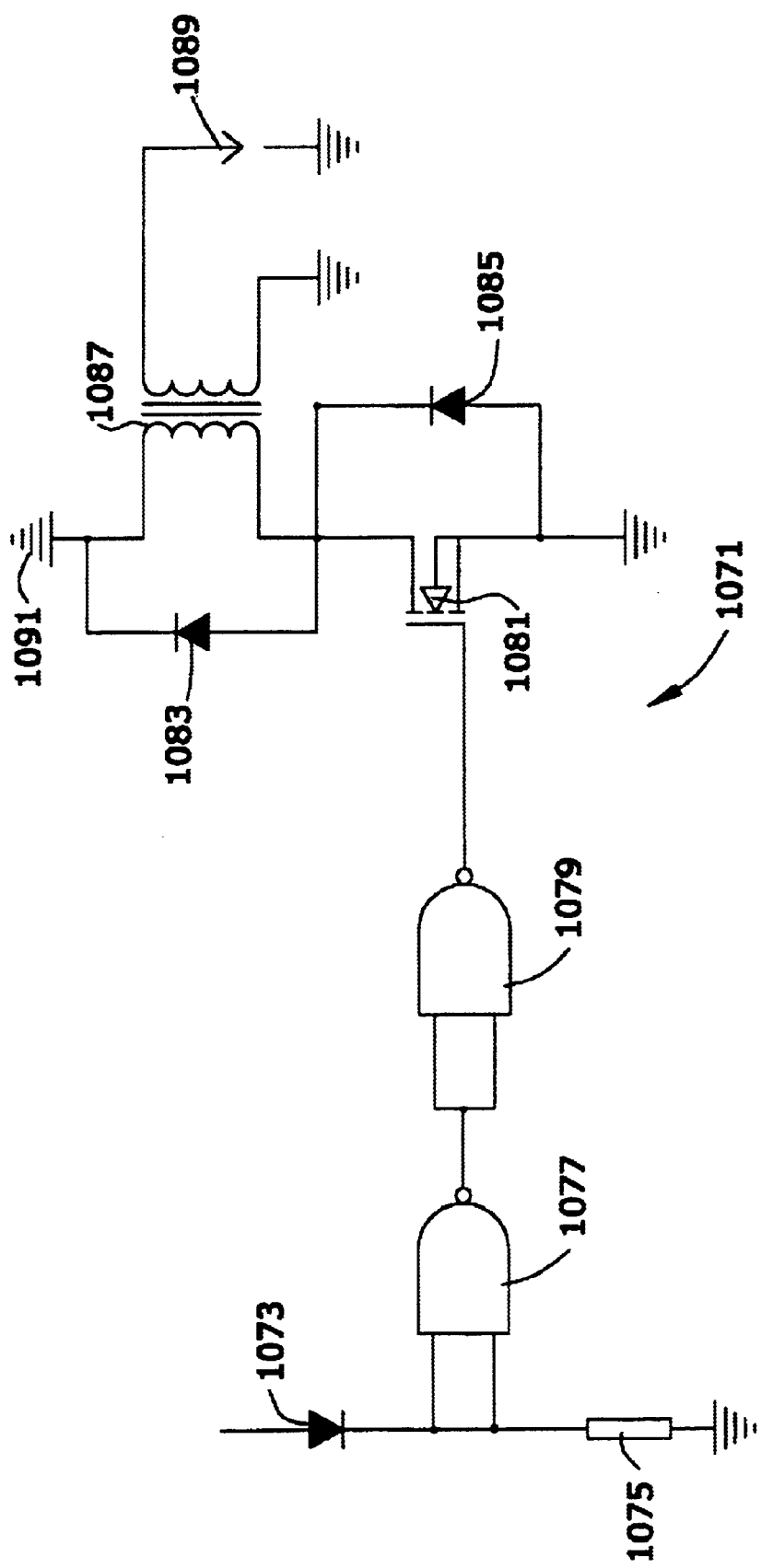
FIG. 7 is a electrical schematic of a preferred circuit used for delivering electrical energy to the precombustor of FIG. 6.

The circuit used to delivery to power to the spark plug 1074 is depicted in FIG. 7. The circuit 1071 is comprised of diode 1073, a resistor 1075, a gate 1077, a gate 1079, a mosfet 1081, a diode 1083, a diode 1085, a coil 1087. The output pulses were delivered via line 1089. As will be apparent, the high voltage circuit 1071, was capable of taking a 12 volt input (from battery 1091) and converting it into a high voltage output.

No external heat source was used in tis experiment. The spark plug 1074 was sufficient to increase the temperature of the system from ambient to about 900 degrees Celsius in less than about 2 seconds.

The product gas formed was removed through port 1076. It contained 14 molar percent of hydrogen, 56 molar percent of nitrogen, 12 molar percent of methane, with the balance being comprised of carbon monoxide and carbon dioxide.

The gas produced from port 1076 can be supplied to two other assemblies: a reformer assembly, and a heat exchanging system.

EXAMPLE 5

The gas produced in the experiment of example 4 was fed to a reformer assembly 1078, as is illustrated in FIG. 8.

The reformer 1078 was comprised of the disks 1064 and the rings 1068 (not shown) described for the experiment of example 4; however, in this example, the disks 1064 and the rings 1068 were coated with the FCR-HCl catalyst, obtained from Sud-Chemie Inc. of Lousiville, Ky., described in the experiment of example 1; the coating weight used was substantially identical to the coating weight utilized in example 1.

Alternating disks 1064 and rings 1068 were stacked within reformer 1078; eight such disks, and seven such rings, were used. The total height of the stack was about 8 inches. The total height of the reformer was about 12.5 inches.

A heat exchanging coil 1080 was disposed around the reformer 1078. The coil was comprised of 0.5 inch outside diameter stainless steel pipes wound around the assembly in a spiral pattern.

The gas from port 1076 passed through the assembly 1078, and the disks 1064 and 1068 disposed therein, and it was reformed in such a process. The reformed gas exited via port 1082. A portion of such gas was passed though pipe 1084 into heat exchanger 1080 and then through exit port 1086. This heat exchanged process maintained the reactor 1078 at a temperature of about 800 degrees Celsius.

A portion of the gas exiting via port 1082 was fed to the hydrogen purifier described in Example 2 and purified in substantial accordance with the procedure of such Example 2.

The heat exchanged gas which passed through the heat exchanger 1080 was discharged from port 1086 and fed into pipe heat exchanger 1088. Pipe heat exchanger 1088 was made from a pipe 1092 (0.5 inch outside diameter) disposed within a pipe 1094 (0.75 inch outside diameter). Ambient air, at a delivery pressure of 25 pounds per square inch gauge, was fed via port 1096 and was heated by the heat exchanged gas fed via line 1090. The heated air was removed from the assembly 1088, via port 1098, and fed into port 1072 of assembly 1060 via line 1100.

EXAMPLE 6

The procedure of example 5 was substantially followed, with the exception that a mixture of air and steam was fed via port 1096. The mixture so fed comprised 1 mole fraction of water for every 2 mole fractions of air, and it was at a delivery pressure of 25 pounds per square inch gauge. The air/steam mixture was fed into line 1072 (see FIG. 6), and methane was fed into line 1070 at a rate such that 1 mole of methane was fed for each mole of water.

EXAMPLE 7

Figure 9:
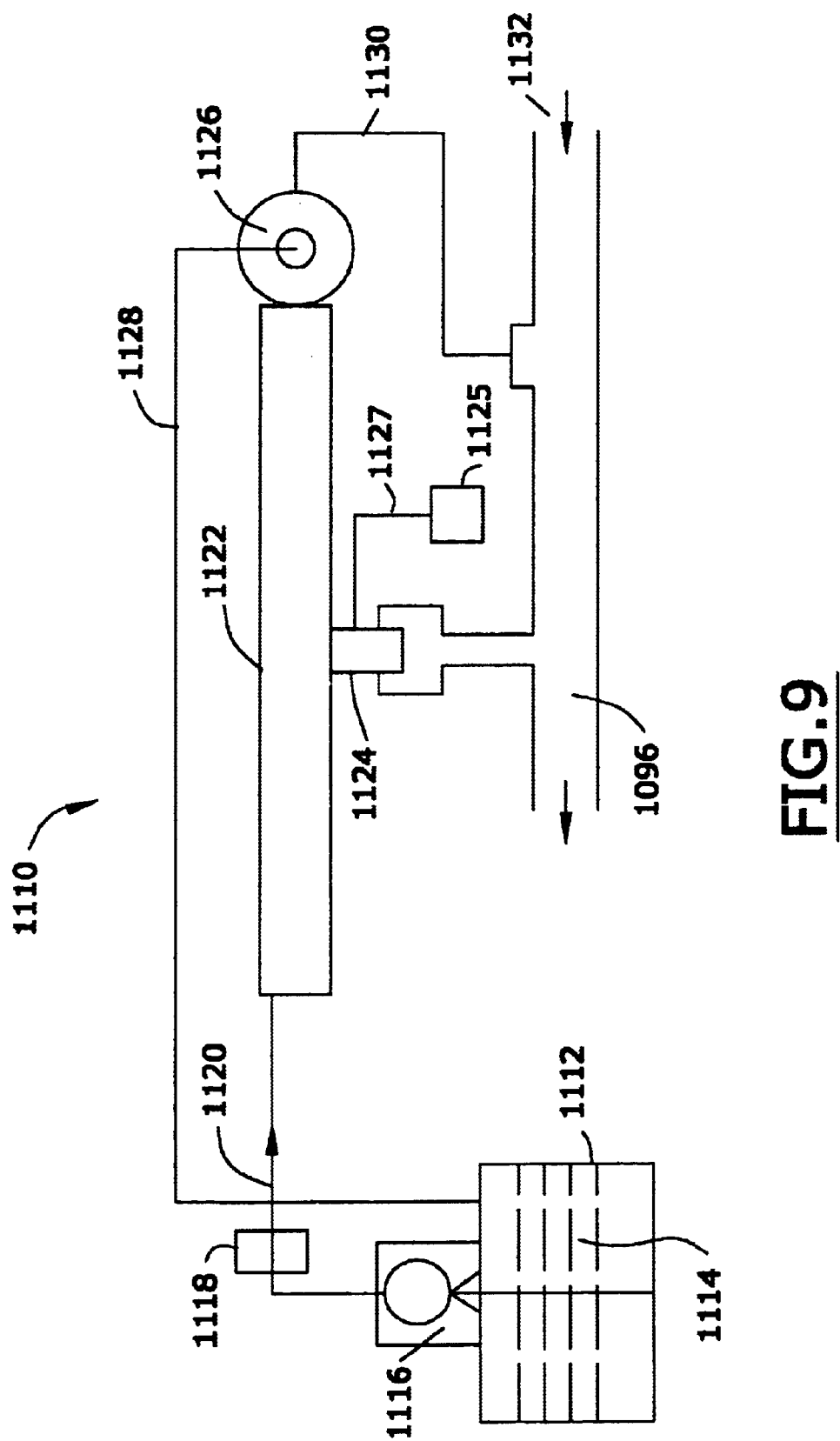
FIG. 9 is a schematic of one preferred water distribution system of the invention.

In this experiment, the process of example 1 was repeated but the steam injection apparatus illustrated in FIG. 9 was used. The apparatus 1110 was comprised of a tank 1112 comprised of water 1114. A wet pump 1116 removed water from the tank 1112 and fed it to wet filter 1118, which purified the water. The purified water was then fed via line 1120 to a water rail 1122. Purified water, at a pressure of 50 pounds per square inch gauge, was injected by water injector 1124 into port 1096 (see FIG. 8) and thence into device 1088 (see FIG. 8). Water which was not injected by injector 1124 was recycled by pressure regulator 1126 and then returned via line 1128 back to tank 1112. Pressurized air was fed via line 1130 to pressure regulator 1126. Pressurized air was fed in the direction of arrows 1132 into device port 1096.

The water injector 1124 was controlled by a single-chip microntroller 1125 which was connected via line 1127 to the injector 1124.

Figure 10:
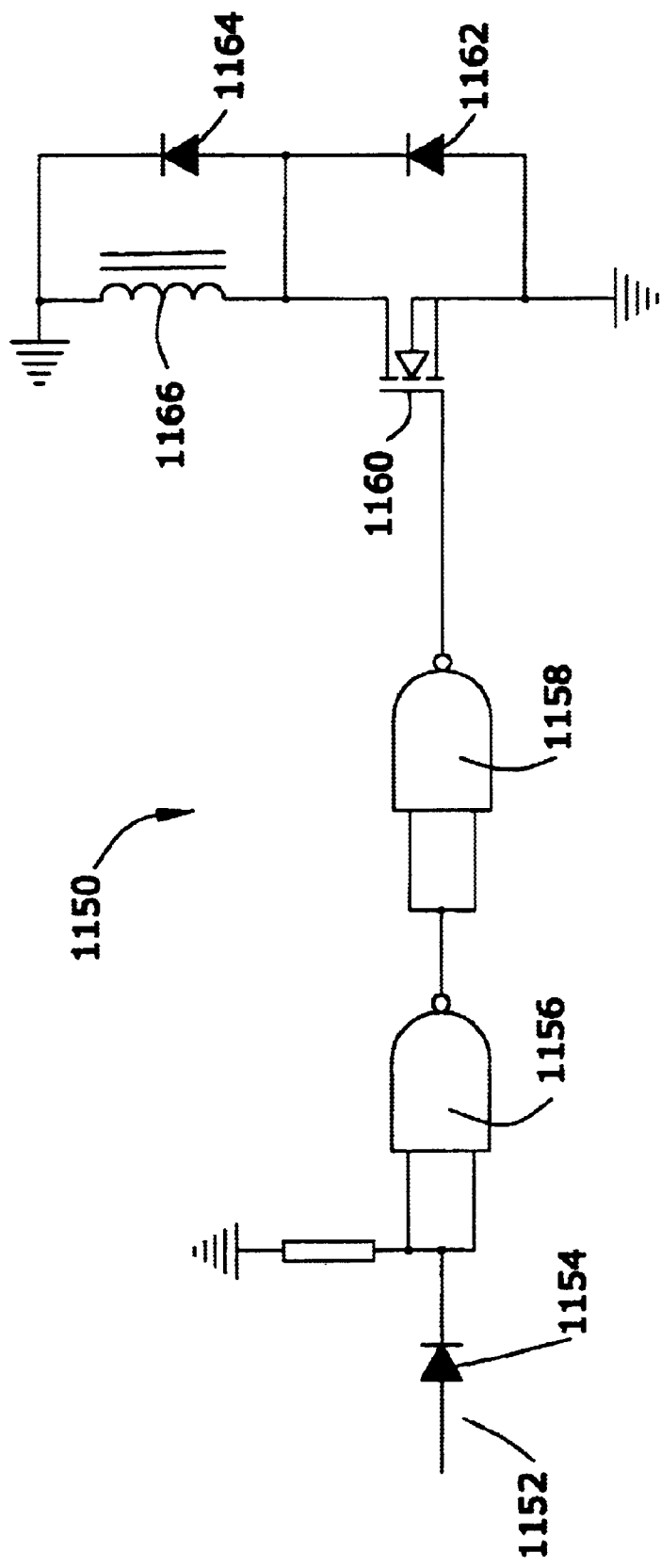
FIG. 10 is a schematic of a controller for the water distribution system of FIG. 9.

The injector 1124 was controlled by an injection control circuit 1150 that is illustrated in FIG. 10. A control pin 1 152 controlled diode 1154. The circuit also comprised gate 1156, gate 1158, metal oxide field effect transistor 1160, diodes 1162 and 1164, and solenoid 1166. As will be apparent, this circuit is similar in many respects to the circuit described in FIG. 7.

It is to be understood that the aforementioned description is illustrative only and that changes can be made in the apparatus, in the ingredients and their proportions, and in the sequence of combinations and process steps, as well as in other aspects of the invention discussed herein, without departing from the scope of the invention as defined in the following claims.

We claim:

1. A process for preparing hydrogen in a fuel processor assembly comprised of a means for supplying a high voltage electrical discharge within said fuel processor, a first catalytic body disposed within said fuel processor, and a second catalytic body disposed within said fuel processor, wherein said first catalytic body and said second catalytic body have different shapes, comprising the steps of:
   (a) feeding methane, an oxygen-containing gas, and a water-containing gas to to said fuel processor, wherein:
      1. from about 4.5 to about 5.5 moles of said methane are fed to said fuel processor assembly for each mole of oxygen in said oxygen-containing gas fed to said fuel processor;
      2. from about 1.8 to about 2.2 moles of water in said water-containing gas are fed to said fuel processor assembly for each mole of methane fed to said fuel processor;
   (b) maintaining said methane, said oxygen-containing gas, and said water-containing gas within said fuel processor assembly at a temperature of from about 600 to about 1100 degrees Celsius and a pressure of from about 10 to about 70 pounds per square inch for from about 0.1 to about 50 seconds, thereby producing a hydrogen-containing gas; and
   (c) purifying said hydrogen-containing gas.

2. The process as recited in claim 1, wherein said methane, said oxygen-containing gas, and water-containing gas are maintained within said fuel processor assembly at a pressure of from about 15 to about 60 pounds per square inch.

3. The process as recited in claim 2, wherein said methane, said oxygen-containing gas, and water-containing gas are maintained within said fuel processor assembly at a temperature of from about 600 to about 850 degrees Celsius.

4. The process as recited in claim 3, wherein said methane, said oxygen-containing gas, and water-containing gas are maintained within said fuel processor for from about 1 to about 10 seconds.

5. The process as recited in claim 4, wherein said oxygen-containing gas is air, and said water-containing gas is steam.

6. A process for preparing hydrogen in a fuel processor assembly comprised of a means for supplying a high voltage electrical discharge within said fuel processor, a first catalytic body disposed within said fuel processor, and a second catalytic body disposed within said fuel processor, wherein said first catalytic body and said second catalytic body have different shapes, comprising the steps of:
   (a) feeding methane, and an oxygen-containing gas to said fuel processor, wherein from about 4.5 to about 5.5 moles of said methane are fed to said fuel processor assembly for each mole of oxygen in said oxygen-containing gas fed to said fuel processor;
   (b) maintaining said methane, said oxygen-containing gas, and said water-containing gas within said fuel processor assembly at a temperature of from about 600 to about 1100 degrees Celsius and a pressure of from about 10 to about 70 pounds per square inch for from about 1 to about 10 seconds, thereby producing a hydrogen/containing gas; and
   (c) purifying said hydrogen-containing gas.

7. The process as recited in claim 6, wherein said methane and said oxygen-containing gas are maintained within said fuel processor assembly at a pressure of from about 15 to about 60 pounds per square inch.

8. The process as recited in claim 7, wherein said methane and said oxygen-containing gas are maintained within said fuel processor assembly at a temperature of from about 600 to about 850 degrees Celsius.

9. The process as recited in claim 8, wherein said methane and said oxygen-containing gas are maintained within said fuel processor for from about 5 to about 10 seconds.

10. The process as recited in claim 9, wherein said oxygen-containing gas is air.

11. A process for preparing hydrogen in a fuel processor assembly comprised of a means for supplying a high voltage electrical discharge within said fuel processor, a first catalytic body disposed within said fuel processor, and a second catalytic body disposed within said fuel processor, wherein said first catalytic body and said second catalytic body have different shapes, comprising the steps of:
   (a) feeding methane and a water-containing gas to said fuel processor, wherein from about 3.6 to about 4.4 moles of said water in said water-containing gas is fed to methane are fed to said fuel processor assembly for each mole of methane fed to said fuel processor;

(b) maintaining said methane and said water-containing gas within said fuel processor assembly at a temperature of from about 600 to about 1100 degrees Celsius and a pressure of from about 10 to about 70 pounds per square inch for from about 0.1 to about 50 seconds, thereby producing a hydrogen-containing gas; and (c) purifying said hydrogen-containing gas.

12. The process as recited in claim 11, wherein said water-containing gas is steam.

13. The process as recited in claim 12, wherein said methane and said steam are maintained within said fuel processor assembly at a pressure of from about 15 to about 60 pounds per square inch.

14. The process as recited in claim 13, wherein said methane and said steam are maintained within said fuel processor assembly at a temperature of from about 600 to about 850 degrees Celsius.

15. The process as recited in claim 14, wherein said methane and said steam are maintained within said fuel processor for from about 1 to about 10 seconds.

* * * * *